Sept. 19, 1961  L. P. ZICK  3,000,091
CLADDING ASSEMBLY
Filed Oct. 30, 1958  2 Sheets-Sheet 1

Inventor:
Leonard P. Zick,
By Merriam, Lorch & Smith.
Attys.

Sept. 19, 1961 L. P. ZICK 3,000,091
CLADDING ASSEMBLY
Filed Oct. 30, 1958 2 Sheets-Sheet 2
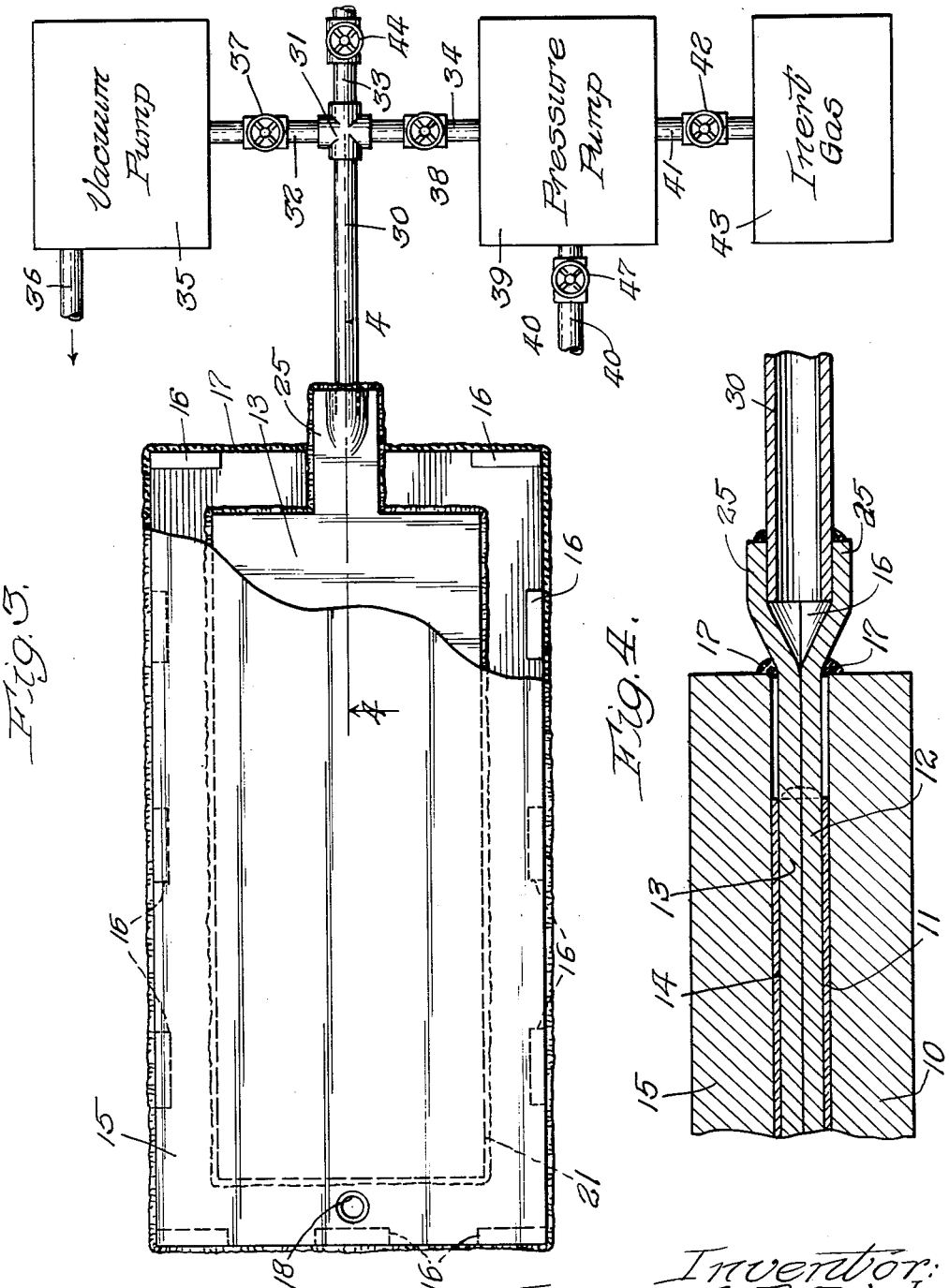

3,000,091
CLADDING ASSEMBLY

Leonard P. Zick, Chicago, Ill., assignor to Chicago Bridge and Iron Company, Chicago, Ill., a corporation of Illinois
Filed Oct. 30, 1958, Ser. No. 770,669
9 Claims. (Cl. 29—471.5)

This invention relates to a cladding assembly and, more particularly, to a double sandwich cladding assembly. This application is a continuation-in-part of my copending application Serial No. 219,837, filed April 7, 1951, now abandoned and my copending application Serial No. 469,909, filed November 19, 1954, now abandoned.

This invention is intended to be used in connection with the vacuum brazing of a sheet or plate to another sheet or plate, usually of different characteristics. The basic process for carrying out such a treatment is shown in United States Patent No. 2,713,197, issued July 19, 1955 to Robert L. Brown. In that process a vacuum is applied to the space between the cladding plate and the base plate so that the pressure of the atmosphere is exerted to force the two plates together while the brazing material between them is melted. The present invention is primarily designed for use when two or more clad plates are produced in a double sandwich by this process. It is particularly adaptable for use with thick plates of such a thickness that the pressure of the atmosphere may not be thoroughly exerted through the thickness of mercury the base plates to force them in intimate continuous contact with the cladding plates. My invention makes it possible to use a double sandwich even with the thickest base plates by providing conduit means through which gas pressure is applied within the internal cladding envelope at the same time the pressure of the atmosphere is applied to the exterior of the double sandwich.

The invention is illustrated in the drawings in which:

FIG. 3 is a plan view, partly broken away, of a double cladding sandwich like that of FIG. 1 except that the conduit communicates with gas pressure controlling apparatus; and FIG. 4 is a partial sectional view of FIG. 3 taken at the line 4—4.

In the drawings the same numbers employed in different views indicate that the element is the same in each view.

Figure 1:
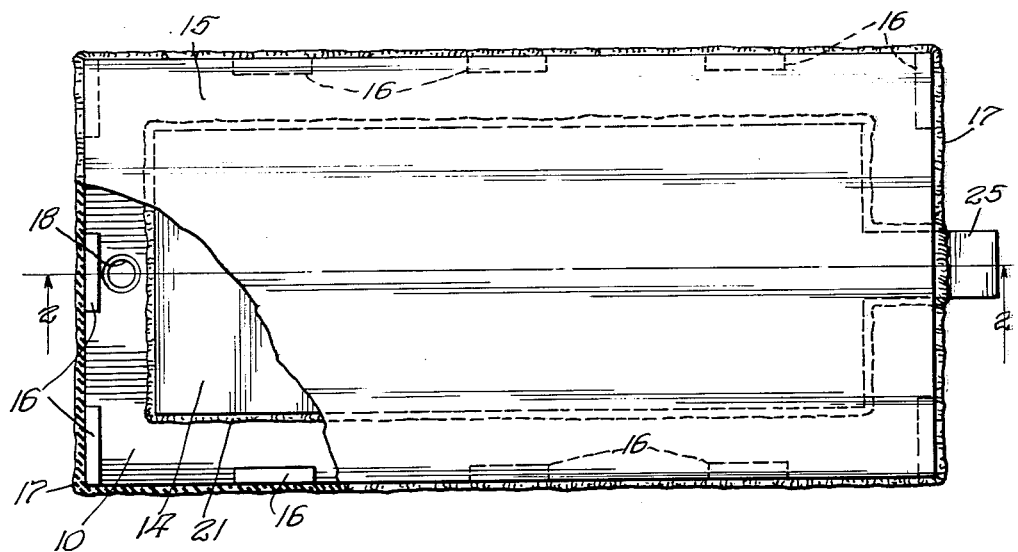
FIG. 1 is a plan view, partly broken away, of a double cladding sandwich with a conduit to the inner cladding envelope.
Figure 2:
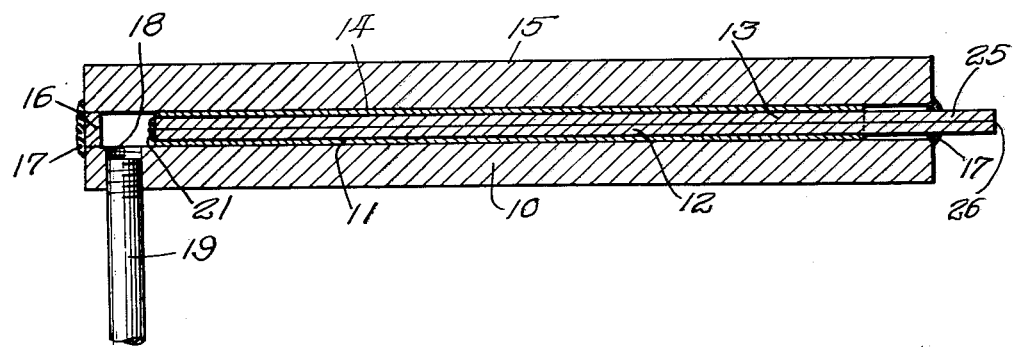
FIG. 2 is a sectional view of FIG. 1 taken at line 2—2.

As shown in FIGS. 1 and 2, a double cladding sandwich is formed by assembling a lower base plate 10, a layer of brazing material 11, often copper foil, of slightly smaller dimensions than the base plate, a cladding plate 12 of the same general dimensions as the brazing material, a second cladding plate 13 of the same approximate dimensions and area as cladding plate 12, a layer of brazing material 14 of the same dimensions and area as brazing material 11 and an upper base plate 15 of substantially the same area as the lower base plate 10. It will be appreciated that each layer of brazing material shown in FIGURES 1 and 2 actually is between one of the cladding plates and base plates, and that the two cladding plates themselves are likewise in substantial contact and thus form an inner cladding envelope. Shims 16 are provided to space the base plates apart at the edges.

Each of the cladding plates are provided with a nose or extension 25 which extends beyond the peripheral welding 17 about the edge of the base plates. The two complementary nose portions 25 are welded at the edges thereof except for an opening 26 which leads to the inside area between the adjoining cladding plates. Weld 21 around the edge of the cladding plates hermetically seals the plates into a cladding envelope so that access to the inside can be effected only through opening 26. The nose portions provided with the opening 26 thus constitute a conduit through which the gas pressure in the cladding envelope may be raised or lowered.

The welding 17 extends completely around the base plate so that the interior thereof is sealed from the atmosphere except for pipe connection 19 of which there is at least one provided from the outlet 18. The pipe 19 leads to a vacuum pump capable of maintaining the interior of the cladding sandwich under substantially complete vacuum during the brazing operation except for the area between cladding plates 12 and 13. Normally, the pressure should be below 18 inches of mercury vacuum, and preferably should be close to 28 or 29 inches of vacuum.

After the double cladding sandwich is assembled the cladding plates are brazed to the base plates by appropriate heating action while the interior zone is evacuated as taught in the Brown patent supra, except that opening 26 communicates with the atmosphere or other source of controlled gas pressure. After cooling, the edges of the sandwich are sheared off at a point immediately within the weld 21 which binds the two cladding plates together; there is thus produced two independent clad plates.

The usual base plate metals are ordinary carbon steels and the usual clad metals are what may be defined as alloy steels, this term including steels which have been given unusual properties of corrosion resistance, high or low temperatures resistance or other like properties. Within this term are included nickel bearing steels, stainless steels, Monel metal and even nickel itself.

The present form of cladding sandwich has an advantage over previous assemblies in that the pressure of the atmosphere or a controlled or regulated gas pressure is applied by means of opening 26 to the inside of the cladding envelope to force each base plate and its adjacent clad plate together. Thus, there is atmospheric pressure or a controllable gas pressure forcing the cladding plates away from each other and, at the same time, there is atmospheric pressure pressing both of the base plates inwardly toward the cladding plates. The presence of any hills or valleys in the thick unyielding or only partially yielding plates can thus be overcome by having the pressure against the thinner cladding plate urge it into complementary contact with the thicker plate.

The double cladding sandwich of FIGS. 3 and 4 is similar to that of FIGS. 1 and 2 except that opening 16 has been enlarged by spreading nose portions 25 apart to provide a suitable orifice for connecting pipe 30 thereto. Pipe 30 connects to a cross fitting 31. From the cross fitting 31 run pipes 32, 33 and 34. Pipe 32 communicates with a vacuum pump 35 which has exit pipe 36 leading from it. Valve 37 is placed in pipe 32 to regulate and stop flow of gas therethrough. Pipe 34 containing valve 38 leads from cross fitting 31 to a pressure pump 39. The pressure pump has pipe 40 leading to the atmosphere and pipe 41 containing valve 42 leading to a vessel 43 for holding an inert gas. Also leading to the cross fitting 31 is pipe 33 containing valve 44; pipe 33 is open to the atmosphere.

The apparatus of FIG. 3 may be used to obtain a wide variety of pressures inside the cladding envelope. Thus, by closing valves 37 and 38 and opening valve 44, atmospheric pressure will be maintained in the cladding envelope since conduit 33 will lead to the atmosphere.

By closing valves 38 and 44 and opening valve 37 the vacuum pump can evacuate the cladding envelope to any desired vacuum or sub-atmospheric pressure. Even if it is intended to subsequently apply a super-atmospheric pressure in the cladding envelope, it is sometimes advisable to first evacuate the envelope to remove the gases present naturally and those released during heating of the cladding sandwich.

Gas pressure may be applied inside the cladding envelope by means of pressure pump 39 with valve 38 open and valves 37 and 44 closed. Air may be pumped into the cladding envelope by opening valve 47 and closing valve 42. Alternatively, an inert gas may be pumped into the cladding sandwich by closing valve 47 and opening valve 42. By these operations the internal pressure in the cladding envelope may be readily regulated and adjusted to the pressure necessary to force the plates into intimate contact for and during brazing.

With some metals, particularly Monel, there is a tendency for the two cladding plates to adhere after the brazing operation due to inter-diffusion or migration of metal in the solid phase. With such metals it is desirable to employ a separator such as aluminum oxide or the like between the cladding plates.

In connection with thick sheets, as for example where the base plates may be as thick as 3 inches, the cladding assembly of this invention permits the pressure to be exerted through the relatively thin cladding sheets which normally are more likely to be from ⅛ to ½ inch in thickness.

As an example of the procedure using base plates 2 inches in thickness and cladding plates of 12 gauge, the following procedure was followed:

The example was carried out in a 2500° F. Lindberg electric furnace with a 25 c.f.m. Kinney pump and oil diffusion booster pump for vacuum. The upper base plate was a 15″ x 2″ x 17″ A-285 Gr. C Fox Steel; the bottom base plate was 16″ x 2″ x 18″ A-285 Gr. C. Fox Steel. The inner sandwich consisted of two pieces of 12 gauge 10″ x 12″ type 316ELC stainless steel. The brazing material was 0.0025″ copper foil, spacing shims 16 of ³⁄₁₆″ x ¼″ steel were employed to space the base plates at the edges.

The scale was removed from the base plates by pickling for one hour. The copper foil was pickled in sulfuric acid, rinsed in water, then in naphtha, and dried with clean rags. The inner cladding envelope was made up of two 12 gauge sheets of stainless steel 10″ x 12″ with a 3 inch tab on one side. These were rinsed in naphtha and dried. They were welded together around the edges after the inner surfaces had been coated with aluminum oxide ($Al_2O_3$). Type 316ELC ⅛ inch electrodes were used. The cladding envelope was tested for leaks with a ¼ inch pipe fitting welded to the protruding tab. The cladding envelope exterior was cleaned with a No. 24 grit disc sander.

The sandwich was assembled as shown in FIGS. 1 and 2 and welded around the edges with ¼ inch L.H. 70 electrodes. This sandwich assembly allows the tab of the cladding envelope to protrude and thus allow entrance of the atmosphere into the space between the two stainless steel sheets. A vacuum line (19 in FIG. 2) was attached for evacuating the sandwich. The sandwich was bonded for two hours at 2050° F.

The heating data are as follows:

| Time, min. | Plate Temp., ° F. | Furnace Temp., ° F. | Vacuum, Microns |
|---|---|---|---|
| 0 | R.T. | 1,900 | 20 |
| 5 | 985 | 1,750 | 52 |
| 20 | 1,080 | 1,730 | 42 |
| 30 | 1,210 | 1,770 | 33 |
| 45 | 1,355 | 1,835 | 40 |
| 55 | 1,430 | 1,925 | 50 |
| 65 | 1,550 | 2,010 | 45 |
| 75 | 1,666 | 2,060 | 45 |
| 85 | 1,786 | 2,130 | 50 |
| 95 | 1,890 | 2,160 | 45 |
| 105 | 1,975 | 2,245 | 50 |
| 108 | 2,015 | 2,250 | 45 |
| 110 | 2,025 | 2,250 | 41 |
| 115 | [1] 2,057 | 2,270 | 45 |
| 118 | [1] 2,075 | 2,220 | 48 |
| 155 | [1] 2,025 | 2,055 | 45 |
| 170 | [1] 2,030 | 2,085 | 28 |
| 185 | [1] 2,040 | 2,100 | 23 |
| 190 | [1] 2,050 | 2,100 | 29 |
| 205 | [1] 2,055 | 2,110 | 29 |
| 220 | [1] 2,054 | 2,080 | 30 |
| 235 | [1] 2,052 | 2,075 | 32 |

[1] Two hour holding time.
The furnace was shut off, and the door opened. The sandwich was removed from furnace after cooling to 490° F.

After the sandwich was cut open the top clad plate was normalized for one hour at a temperature of 1600° F.

Test specimens were cut from the normalized and the "as-bonded" plates. The shear tests were removed from areas of the plate so that the shear strengths of the edge area and intermediate areas could be compared. These specimens were in accordance with ASTM specifications. The uniformity of the bond was also checked in these three areas by microscopic examination.

The results of shear tests are reported in Table I:

*Table I.—Shear tests*

| Test | Condition | Area | Shear Strength, p.s.i. | Remarks |
|---|---|---|---|---|
| 1B | As bonded | Edge | 45,800 | 95% of shear occurred in plate. |
| 2B | do | do | 42,300 | Shear attempted to start in plate. |
| 3B | do | do | 38,600 | |
| 4B | do | Inter | 36,400 | 15% of shear occurred in plate. |
| 5B | do | Inter | 34,300 | |
| 6B | do | Inter | 35,800 | |
| 7B | do | Center | 39,800 | |
| 8B | do | do | 35,000 | 3% of shear occurred in plate. |
| 9B | do | do | 35,200 | |
| 1T | Normalized | Edge | 45,600 | 5% of shear occurred in plate. |
| 2T | do | do | 40,600 | 2% of shear occurred in plate. |
| 3T | do | do | 48,300 | 10% of shear occurred in plate. |
| 4T | do | Inter | 40,700 | |
| 5T | do | Inter | 41,100 | 2% of shear occurred in plate. |
| 6T | do | Inter | 43,100 | 2% of shear occurred in plate. |
| 7T | do | Center | 45,200 | 3% of shear occurred in plate. |
| 8T | do | do | 46,500 | 3% of shear occurred in plate. |
| 9T | do | do | 43,300 | 3% of shear occurred in plate. |

NOTE: No oxidation in any of the shear tests.

The definition of the word "plates" in the claims hereof is not intended to be restricted to the engineering definition for plates, but it is intended also to include sheets. It is also obvious that while I have described a sandwich consisting of two cladding plates and two base plates, the assembly can be multiplied by including additional base plates and cladding plates. For example, it is possible to employ four cladding plates and three base plates, each pair of cladding plates forming a closed assembly open to the atmosphere or a controlled source of gas pressure by a restricted opening and each said pair separating two base plates. The resulting structure will produce two base plates clad on one side and one base plate clad on both sides.

Having described my invention in considerable detail, it is my intention that the invention be not limited by any of the details of description unless otherwise specified, but rather be construed broadly within the spirit and scope as set out in the accompanying claims.

What is claimed is:

1. A cladding sandwich including two inner plates arranged with the edges of the plates hermetically sealed together in the form of an envelope, said envelope being surrounded by plates in face-to-face relationship to the envelope with brazing material between the inner plates forming the envelope and each adjacent surrounding plate thereby forming a compositie assembly, the edges of the assembly being hermetically sealed to produce an evacuable zone between the base plates and the outside of the envelope, means for evacuating said evacuable zone, and a gas conveying conduit communicating with the interior of the envelope and leading outside the assembly, without communicating with the evacuable zone, to means for controlling the gas pressure in the envelope independently of pressure in the evacuable zone.

2. A method of cladding a plate to another plate comprising positioning and arranging two inner plates with the edges of the plates hermetically sealed together in the form of an envelope, surrounding said envelope with plates in face-to-face relationship to the envelope with brazing material between the inner plates forming the envelope and each adjacent surrounding plate thereby forming a composite assembly, hermetically sealing the edges of the assembly to produce an evacuable zone between the surrounding plates and the outside of the envelope, providing a gas conveying conduit communicating with the interior of the envelope and leading outside the sandwich to means for controlling the gas pressure in the envelope without communicating with the evacuable zone, evacuating the zone below atmospheric pressure, regulating the gas pressure in the envelope by the gas conveying conduit and gas pressure controlling means to above atmospheric pressure, and heating the composite assembly to effect brazing.

3. A method of cladding a plate to another plate comprising placing two cladding plates in face-to-face arrangement to each other and hermetically sealing the edges of the cladding plates together to form an envelope, placing base plates on each side of the envelope in face-to-face relationship to the cladding plates with brazing material between adjacent cladding and base plates, hermetically sealing the space between the base plates and the outside of the envelope to produce an evacuable zone, providing a gas conveying conduit which communicates with the interior of the cladding envelope and leads therefrom to outside the sandwich to a source of gas pressure without communicating with the evacuable zone, evacuating the zone, regulating the gas pressure in the cladding envelope independently, and to be in excess, of the pressure in the evacuable zone by means of the gas conveying conduit, and heating the sandwich to effect brazing.

4. A method of cladding as set forth in claim 3 in which the inner envelope is connected by the said conduit to a controlled source of gas pressure.

5. A method of cladding a plate to another plate comprising placing two inner plates in face-to-face arrangement to each other and hermetically sealing the edges of the plates together to form an envelope, placing base plates on each side of the envelope in face-to-face relationship to the inner plates with brazing material between adjacent inner and base plates, hermetically sealing the space between the base plates and the outside of the envelope to produce an evacuable zone, reducing the pressure in the evacuable zone to below atmospheric pressure, regulating the gas pressure in the envelope independently, and to be in excess, of the pressure in the evacuable zone by means of a source of gas pressure external to the sandwich, and heating the sandwich to effect brazing.

6. A method of cladding a plate to another plate comprising placing two inner plates in face-to-face arrangement with the edges of the plates hermetically sealed together in the form of an envelope, surrounding said envelope with plates in face-to-face relationship to the envelope with brazing material between each inner plate forming the envelope and each adjacent surrounding plate thereby forming a sandwich, hermetically sealing the edges of the sandwich to produce an evacuable zone between the surrounding plates and the outside of the envelope, providing a gas conveying conduit which communicates with the interior of the cladding envelope and leads therefrom to outside the sandwich to a source of gas pressure wtihout communicating with the evacuable zone, reducing the pressure in the evacuable zone to below atmospheric pressure, regulating the gas pressure in the envelope independently, and to be in excess, of the pressure in the evacuable zone by means of the gas conveying conduit, and heating the sandwich to effect brazing.

7. A method of cladding a plate to another plate comprising placing two inner plates in face-to-face arrangement with the edges of the plates hermetically sealed together in the form of an envelope, surrounding said envelope with plates in face-to-face relationship to the envelope with brazing material between the inner plates forming the envelope and each adjacent surrounding plate thereby forming a sandwich, hermetically sealing the edges of the sandwich to produce an evacuable zone between the surrounding plates and the outside of the envelope, providing a gas conveying conduit which communicates with the interior of the cladding envelope and leads therefrom to the atmosphere without communicating with the evacuable zone, reducing the pressure in the evacuable zone to substantially below atmospheric pressure and heating the sandwich to effect brazing while maintaining the exterior of the sandwich under atmospheric pressure and while the pressure in the evacuable zone is substantially below atmospheric pressure.

8. A cladding sandwich including two cladding plates in face-to-face arrangement with the edges of the cladding plates hermetically sealed together in the form of an envelope, a base plate on each side of the envelope in face-to-face arrangement thereto with brazing material between adjacent cladding and base plates, means by which the edges of the sandwich are hermetically sealed to produce an evacuable zone between the base plates and the outside of the envelope, a gas conveying first conduit communicating with the interior of the envelope and leading outside the sandwich to a source of gas pressure without communicating with the evacuable zone, and a second conduit communicating with the evacuable zone from outside the sandwich for reducing the pressure in the evacuable zone below atmospheric pressure independently of the pressure in the envelope regulated by the first conduit.

9. A cladding sandwich including two inner plates in face-to-face arrangement with the edges of the plates hermetically sealed together in the form of an envelope, said envelope being surrounded by plates in face-to-face relationship to the envelope with brazing material between the inner plates forming the envelope and each adjacent surrounding plate thereby forming a sandwich, the edges of the sandwich being hermetically sealed to produce an evacuable zone between the surrounding plates and the outside of the envelope, means for evacuating said evacuable zone, and a gas conveying conduit communicating with the interior of the envelope and leading outside the sandwich to a source of gas pressure without communicating with the evacuable zone.

References Cited in the file of this patent

UNITED STATES PATENTS

| | | |
|---|---|---|
| 2,159,043 | Orr | May 23, 1939 |
| 2,713,196 | Brown | July 19, 1955 |
| 2,794,243 | Schweller | June 4, 1957 |
| 2,820,286 | Andrus | Jan. 21, 1958 |
| 2,919,487 | Stiles et al. | Jan. 5, 1960 |

UNITED STATES PATENT OFFICE
CERTIFICATION OF CORRECTION

Patent No. 3,000,091            September 19, 1961

Leonard P. Zick

It is hereby certified that error appears in the above numbered patent requiring correction and that the said Letters Patent should read as corrected below.

In the drawings, Sheet 2, Fig. 4, the numeral 16 applied to the opening defined by nose portions 25 for reception of pipe 30 should be 26; column 1, line 29, strike out "mercury"; column 2, line 22, after "of" insert -- mercury --; line 36, for "temperaturee" read -- temperature --; column 3, lines 46 and 48, for "Fox", each occurrence, read -- Fbx --.

Signed and sealed this 10th day of April 1962.

(SEAL)
Attest:

ERNEST W. SWIDER                          DAVID L. LADD
Attesting Officer                           Commissioner of Patents